United States Patent
Chiu

(10) Patent No.: US 8,291,242 B2
(45) Date of Patent: Oct. 16, 2012

(54) METHOD FOR TRANSFORMING VOLTAGE IDENTIFICATION CODE OF A MICROPROCESSOR

(75) Inventor: Ming-Hui Chiu, Taipei (TW)

(73) Assignee: ASMedia Technology Inc., New Taipei (TW)

( * ) Notice: Subject to any disclaimer, the term of this patent is extended or adjusted under 35 U.S.C. 154(b) by 427 days.

(21) Appl. No.: 12/624,878

(22) Filed: Nov. 24, 2009

(65) Prior Publication Data
US 2010/0153754 A1    Jun. 17, 2010

(30) Foreign Application Priority Data
Dec. 12, 2008   (TW) .............................. 97148581 A

(51) Int. Cl.
G06F 1/00    (2006.01)
G05F 1/00    (2006.01)
G05F 3/16    (2006.01)
H02M 1/12    (2006.01)

(52) U.S. Cl. ........... 713/300; 323/282; 323/313; 363/41

(58) Field of Classification Search .................. 713/300; 323/282, 313; 363/41
See application file for complete search history.

(56) References Cited

U.S. PATENT DOCUMENTS

| 6,944,783 | B2 * | 9/2005 | Yu et al. ......................... 713/340 |
| 7,565,560 | B2 * | 7/2009 | Boecker et al. ............... 713/320 |
| 7,779,279 | B2 * | 8/2010 | Huang et al. .................. 713/310 |
| 2002/0188874 | A1 | 12/2002 | Yu et al. |
| 2002/0194516 | A1 * | 12/2002 | Muratov et al. ............... 713/320 |
| 2006/0085656 | A1 * | 4/2006 | Betts-LaCroix .............. 713/300 |
| 2007/0300087 | A1 | 12/2007 | Huang et al. |

FOREIGN PATENT DOCUMENTS

| CN | 200979689 Y | 11/2007 |
| KR | 20030088732 A | 11/2003 |
| TW | 200801919 | 1/2008 |

* cited by examiner

*Primary Examiner* — Stefan Stoynov
(74) *Attorney, Agent, or Firm* — Jianq Chyun IP Office

(57) ABSTRACT

The disclosure is related to a method for transforming voltage identification codes of a microprocessor. The method comprises the steps of: receiving a first voltage identification code of a first voltage regulation standard, wherein the first voltage identification code is in correspondence with a first voltage; and transforming the first voltage identification code into a second voltage identification code of a second voltage regulation standard, wherein the second voltage identification code is in correspondence with a second voltage, and the second voltage is the same as the first voltage.

6 Claims, 4 Drawing Sheets

```
                    ┌─ S202
The microprocessor 102 outputs the
voltage identification code DT_in of
  the "DT Diamondville" technology ↓
                    ┌─ S204
The "DT Diamondville to IMVP6" voltage identification
code transform table is used for transforming the voltage
identification code DT_in into the voltage identification
   code IMVP6_out of the "IMVP6" technology
```

FIG.2A

| DT_in [6:0] | | | | | | | | IMVP6_out [6:0] | | | | | | | |
|---|---|---|---|---|---|---|---|---|---|---|---|---|---|---|---|
| [6] | [5] | [4] | [3] | [2] | [1] | [0] | Voltage | [6] | [5] | [4] | [3] | [2] | [1] | [0] | Voltage |
| 0 | 0 | 1 | 1 | 0 | 0 | 0 | X | 0 | 0 | 1 | 1 | 0 | 0 | 0 | 1.2000 |
| 0 | 0 | 1 | 1 | 0 | 0 | 1 | X | 0 | 0 | 1 | 1 | 0 | 0 | 1 | 1.1875 |
| 0 | 0 | 1 | 1 | 0 | 1 | 0 | X | 0 | 0 | 1 | 1 | 0 | 1 | 0 | 1.1750 |
| 0 | 0 | 1 | 1 | 0 | 1 | 1 | X | 0 | 0 | 1 | 1 | 0 | 1 | 1 | 1.1625 |
| 0 | 0 | 1 | 1 | 1 | 0 | 0 | X | 0 | 0 | 1 | 1 | 1 | 0 | 0 | 1.1500 |
| 0 | 0 | 1 | 1 | 1 | 0 | 1 | X | 0 | 0 | 1 | 1 | 1 | 0 | 1 | 1.1375 |
| 0 | 0 | 1 | 1 | 1 | 1 | 0 | X | 0 | 0 | 1 | 1 | 1 | 1 | 0 | 1.1250 |
| 0 | 0 | 1 | 1 | 1 | 1 | 1 | X | 0 | 0 | 1 | 1 | 1 | 1 | 1 | 1.1125 |
| 0 | 1 | 0 | 0 | 0 | 0 | 0 | X | 0 | 1 | 0 | 0 | 0 | 0 | 0 | 1.1100 |
| 0 | 1 | 0 | 0 | 0 | 0 | 1 | 1.2000 | 0 | 1 | 0 | 0 | 0 | 0 | 1 | 1.0875 |
| 0 | 1 | 0 | 0 | 0 | 1 | 0 | 1.1875 | 0 | 1 | 0 | 0 | 0 | 1 | 0 | 1.0750 |

FIG.2B

| VRD10_in [5:0] | | | | | | | VRD11_out [7:0] | | | | | | | | |
|---|---|---|---|---|---|---|---|---|---|---|---|---|---|---|---|
| [4] | [3] | [2] | [1] | [0] | [5] | Voltage | [7] | [6] | [5] | [4] | [3] | [2] | [1] | [0] | Voltage |
| 0 | 1 | 0 | 1 | 0 | 1 | 1.60000 | 0 | 0 | 0 | 0 | 0 | 0 | 0 | 0 | OFF |
| 0 | 1 | 0 | 1 | 1 | 0 | 1.58750 | 0 | 0 | 0 | 0 | 0 | 0 | 0 | 1 | OFF |
| 0 | 1 | 0 | 1 | 1 | 1 | 1.57500 | 0 | 0 | 0 | 0 | 0 | 0 | 1 | 0 | 1.60000 |
| 0 | 1 | 1 | 0 | 0 | 0 | 1.56250 | 0 | 0 | 0 | 0 | 0 | 0 | 1 | 1 | 1.59375 |
| 0 | 1 | 1 | 0 | 0 | 1 | 1.55000 | 0 | 0 | 0 | 0 | 0 | 1 | 0 | 0 | 1.58750 |

| VRD10E_in [6:0] | | | | | | | | VRD11_out [7:0] | | | | | | | | |
|---|---|---|---|---|---|---|---|---|---|---|---|---|---|---|---|---|
| [4] | [3] | [2] | [1] | [0] | [5] | [6] | Voltage | [7] | [6] | [5] | [4] | [3] | [2] | [1] | [0] | Voltage |
| 0 | 1 | 0 | 1 | 0 | 1 | 1 | 1.60000 | 0 | 0 | 0 | 0 | 0 | 0 | 0 | 0 | OFF |
| 0 | 1 | 0 | 1 | 0 | 1 | 0 | 1.54375 | 0 | 0 | 0 | 0 | 0 | 0 | 0 | 1 | OFF |
| 0 | 1 | 0 | 1 | 1 | 0 | 1 | 1.58570 | 0 | 0 | 0 | 0 | 0 | 0 | 1 | 0 | 1.60000 |
| 0 | 1 | 0 | 1 | 1 | 0 | 0 | 1.58125 | 0 | 0 | 0 | 0 | 0 | 0 | 1 | 1 | 1.59375 |
| 0 | 1 | 0 | 1 | 1 | 1 | 1 | 1.57500 | 0 | 0 | 0 | 0 | 0 | 1 | 0 | 0 | 1.58750 |

METHOD FOR TRANSFORMING VOLTAGE IDENTIFICATION CODE OF A MICROPROCESSOR

FIELD OF THE INVENTION

The present invention relates to a method for transforming voltage identification codes of a microprocessor, and more particularly, to a method for transforming voltage identification codes of a microprocessor, such that the microprocessor is able to operate in motherboards with different voltage identification codes.

BACKGROUND OF THE INVENTION

With the development of the technology, fluctuations of the core voltage (Vcore) of a microprocessor (or called as a central processing unit) will affect operations of the microprocessor. If the core voltage is too high, it will increase the heat of the microprocessor, shorten the microprocessor's life expectancy, and even burn it down. On the contrary, if the core voltage is too low, it may cause data corruption, crashes, blue screens and other failures. As the core voltage of the microprocessor is getting higher and higher integration level, production processes become increasingly sophisticated, and the core voltage of the microprocessor is increasing, therefore, a power supply system having higher standards is required.

In the early stages, the motherboard commonly adopts a jumper or a dual inline package (hereinafter is referred to as DIP) switch to set the core voltage of the microprocessor. When installing or replacing the microprocessor, we must plug the jumper or toggle the DIP switch on the motherboard by reference to the core voltage of the microprocessor together with the specification of the motherboard so as to set the core voltage of the microprocessor. However, a slight mistake may burn down the microprocessor or the motherboard, which is very dangerous. In order to solve the abovementioned problem, Intel began to use a voltage identification technology (hereinafter is referred to as "VID") from the Pentium II. The VID technology is a self-adaptive voltage regulation technology. After this technology is adopted, the power supply circuit of the motherboard is capable of automatically setting the desired power supply to the CPU, and manual intervention is not necessary anymore.

Later on, Intel introduces corresponding voltage regulation model (VRM) standards for various kinds of Intel's microprocessor products. Starting from the Prescott microprocessor, this voltage regulation standard is renamed as the voltage regulation down (VRD) standard. As for miscellaneous versions of the voltage regulation down standard, their VID bits, voltage regulation precisions, and regulation voltage ranges are different from each other. From all the reasons above, it is obvious that the microprocessor products with different voltage regulation standards need to operate in corresponding motherboards. Since each motherboard supports one kind of voltage regulation standard only, the motherboard is unable to mixed-use various microprocessor products having different voltage regulation standards.

SUMMARY OF THE INVENTION

It is therefore one of the objectives of the present invention to provide a method for transforming voltage identification codes of a microprocessor and a related computer system, such that the abovementioned problems can be solved.

According to an exemplary embodiment of the present invention, a method for transforming voltage identification codes of a microprocessor is provided. The method consists of the following steps: receiving a first voltage identification code of a first voltage regulation standard, wherein the first voltage identification code is in correspondence with a first voltage; and then transforming the first voltage identification code into a second voltage identification code of a second voltage regulation standard, wherein the second voltage identification code is in correspondence with a second voltage the same as the first voltage.

In addition, according to another exemplary embodiment of the present invention, a computer system is provided. The computer system includes a microprocessor, a pulse-width modulation controller, and a voltage identification code transform circuit. The microprocessor supports a first voltage regulation standard, and the pulse-width modulation controller supports a second voltage regulation standard. The voltage identification code transform circuit has a transform table used for transforming a first voltage identification code of the first voltage regulation standard inputted by the microprocessor into a second voltage identification code of the second voltage regulation standard, wherein a first voltage corresponding to the first voltage identification code of the first voltage regulation standard is the same as a second voltage corresponding to the second voltage identification code of the second voltage regulation standard.

BRIEF DESCRIPTION OF THE DRAWINGS

The above objects and advantages of the present invention will become more readily apparent to those ordinarily skilled in the art after reviewing the following detailed description and accompanying drawings, in which:

FIG. 2A is a flowchart illustrating a method for transforming voltage identification codes of a microprocessor according to a first embodiment of the present invention;

FIG. 2B is a diagram showing a voltage identification code transform table implemented by means of a very-high-speed integrated-circuit Hardware Description Language (VHDL) according to a first embodiment of the present invention;

DETAILED DESCRIPTION OF THE PREFERRED EMBODIMENT

The present invention discloses a method for transforming voltage identification codes of a microprocessor. By transforming voltage identification codes between miscellaneous kinds of voltage regulation standards, such that the microprocessor can be used in motherboards supporting different voltage regulation standards. The features of the present invention will become more detailed and perfect after reviewing the following descriptions and accompanying relevant drawings.

Figure 1:
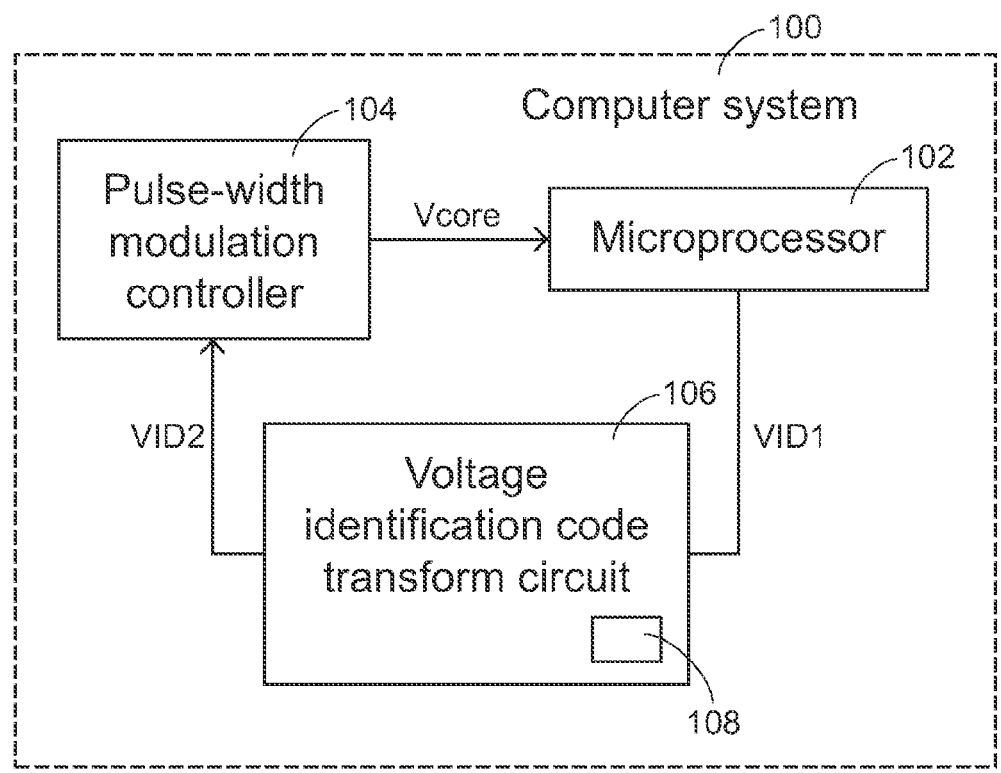
FIG. 1 is a block diagram illustrating a computer system according to an embodiment of the present invention.

FIG. 1 is a block diagram illustrating a computer system according to an embodiment of the present invention. As FIG. 1 depicts, the computer system 100 consists of: a microprocessor 102, a pulse-width modulation controller 104, and a voltage identification code transform circuit 106. The microprocessor 102 supports a first voltage regulation standard, and the microprocessor 102 outputs a voltage identification code VID1. The voltage identification code transform circuit 106 has a transform table 108, and the transform table 108 is used for transforming the voltage identification code VID1 of the first voltage regulation standard inputted by the microprocessor 102 into another voltage identification code VID2 of a second voltage regulation standard. And then the voltage identification code transform circuit 106 transmits the voltage identification code VID2 to the pulse-width modulation controller 104 of a microprocessor's core voltage power supply circuit (not shown) on the motherboard. After that, the pulse-width modulation controller 104 generates a voltage signal Vcore as the core voltage supplied to the microprocessor 102.

In the following descriptions, the applications of the present invention are divided into three embodiments: (1) the first voltage regulation standard is a desktop computer voltage regulation technology (hereinafter referred to as "DT Diamondville"), and the second voltage regulation standard is an Intel Mobile Voltage Positioning 6 technology (hereinafter referred to as "IMVP6"); (2) the first voltage regulation standard is a Voltage Regulator-Down Version 10 (hereinafter referred to as "VRD 10"), and the second voltage regulation standard is a Voltage Regulator-Down Version 11 (hereinafter referred to as "VRD 11"); and (3) the first voltage regulation standard is a Voltage Regulator-Down Extended Version 10 (hereinafter referred to as "VRD 10E"), and the second voltage regulation standard is a VRD 11.

FIG. 2A is a flowchart illustrating a method for transforming voltage identification codes of a microprocessor according to a first embodiment of the present invention. Please refer to FIG. 1 together with FIG. 2A for detailed descriptions of the present invention. In this embodiment, the transform table 108 of the voltage identification code transform circuit 106 is a "DT Diamondville to IMVP6" voltage identification code transform table, wherein the voltage identification code VID1 of the first voltage regulation standard is implemented by the voltage identification code DT_in of the "DT Diamondville" technology and the voltage identification code VID2 of the second voltage regulation standard is implemented by the voltage identification code IMVP6_out of the "IMVP6" technology.

As shown in FIG. 2A, the microprocessor 102 outputs the voltage identification code DT_in of the "DT Diamondville" technology (i.e., Step S202), and the voltage identification code DT_in is in correspondence with the first voltage V1. After that, the "DT Diamondville to IMVP6" voltage identification code transform table of the voltage identification code transform circuit 106 is used for transforming the voltage identification code DT_in of the "DT Diamondville" technology into the voltage identification code IMVP6_out of the "IMVP6" technology (i.e., Step S204), wherein the voltage identification code IMVP6_out is in correspondence with a second voltage V2 the same as the first voltage V1.

FIG. 2B is a diagram showing the "DT Diamondville to IMVP6" voltage identification code transform table implemented by means of a Verilog coding (i.e., a very-high-speed integrated-circuit Hardware Description Language (VHDL)) according to a first embodiment of the present invention. Although only a part of the voltage identification codes of the "DT Diamondville" technology and only a part of the voltage identification codes of the "IMVP6" technology are listed in FIG. 2B, the transform function disclosed in the present invention is suitable for all the voltage identification codes of the "DT Diamondville" technology as well as all the voltage identification codes of the "IMVP6" technology. In addition, the "DT Diamondville to IMVP6" voltage identification code transform table is build by means of a transform function obtained from ranges of the plurality of supported voltages in the "DT Diamondville" technology and the "IMVP6" technology. As for the "DT Diamondville" technology, the voltages corresponding to all of the voltage identification codes is in between 1.2V~0.5V. As for the "IMVP6" technology, the voltages corresponding to all of the voltage identification codes is in between 1.2V~0.125V. Hence, the transform function between the "DT Diamondville" technology and the "IMVP6" technology is represented as below: IMVP6_out[6:0]=DT_in[6:0]-7'b000_1001. Herein IMVP6_out[6:0] represents the voltage identification code of the "IMVP6" technology and is a value of 7-bits; DT_in[6:0] represents the voltage identification code of the "DT Diamondville" technology and is also a value of 7-bits; and 7'b000_1001 equals a decimal digit of 9 and is represented by the binary system.

As FIG. 2B depicts, when DT_in[6] equals 0, DT_in[5] equals 1, DT_in[4] equals 0, DT_in[3] equals 0, DT_in[2] equals 0, DT_in[1] equals 0, and DT_in[0] equals 1, (that is, the voltage identification code DT_in[6:0] is equal to "0100001"), the corresponding first voltage V1 is equal to 1.2V. After processes of the "DT Diamondville to IMVP6" voltage identification code transform table, the voltage identification code IMVP6_out[6:0] of 7-bits will be outputted. Herein, IMVP6_out[6] equals 0, IMVP6_out[5] equals 0, IMVP6_out[4] equals 1, IMVP6_out[3] equals 1, IMVP6_out[2] equals 0, IMVP6_out[1] equals 0, and IMVP6_out[0] equals 0, (that is, the voltage identification code IMVP6_out[6:0] is equal to "0011000"), and the corresponding voltage V2 is equal to 1.2V as well. The rest may be deduced by analogy. When the voltage identification code DT_in[6:0] is equal to "0100010", the corresponding first voltage V1 is equal to 1.1875V. After processes of the "DT Diamondville to IMVP6" voltage identification code transform table, the voltage identification code IMVP6_out[6:0] equaling "0011001" will be outputted, wherein the corresponding second voltage V2 is equal to 1.1875V as well.

Figures 3A, 3B:
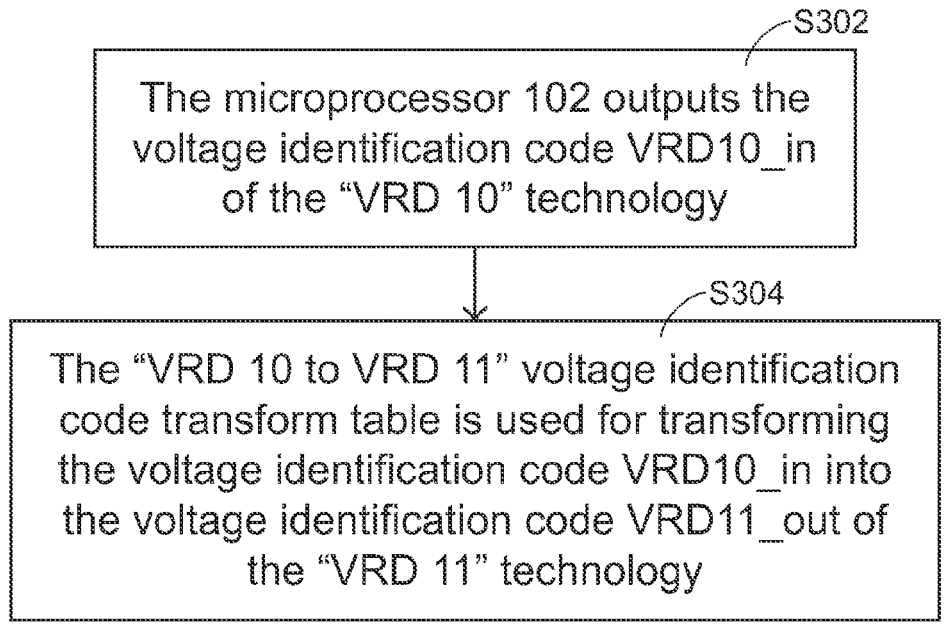
FIG. 3A is a flowchart illustrating a method for transforming voltage identification codes of a microprocessor according to a second embodiment of the present invention.
FIG. 3B is a diagram showing a voltage identification code transform table implemented by means of a very-high-speed integrated-circuit Hardware Description Language (VHDL) according to a second embodiment of the present invention.

FIG. 3A is a flowchart illustrating a method for transforming voltage identification codes of a microprocessor according to a second embodiment of the present invention. Please refer to FIG. 1 together with FIG. 3A for detailed descriptions of the present invention. In this embodiment, the transform table 108 of the voltage identification code transform circuit 106 is a "VRD 10 to VRD 11" voltage identification code transform table, wherein the voltage identification code VID1 of the first voltage regulation standard is implemented by the voltage identification code VRD10_in of the "VRD 10" technology and the voltage identification code VID2 of the second voltage regulation standard is implemented by the voltage identification code VRD11_out of the "VRD 11" technology.

As shown in FIG. 3A, the microprocessor 102 outputs the voltage identification code VRD10_in of the "VRD 10" technology (i.e., Step S302), and the voltage identification code VRD10_in is in correspondence with the first voltage V1. After that, the "VRD 10 to VRD 11" voltage identification code transform table of the voltage identification code transform circuit 106 is used for transforming the voltage identification code VRD10_in of the "VRD 10" technology into the voltage identification code VRD11_out of the "VRD 11"

technology (i.e., Step S304), wherein the voltage identification code VRD11_out is in correspondence with a second voltage V2 the same as the first voltage V1.

FIG. 3B is a diagram showing the "VRD10 to VRD11" voltage identification code transform table implemented by means of a Verilog coding (i.e., a very-high-speed integrated-circuit Hardware Description Language (VHDL)) according to a second embodiment of the present invention. Although only a part of the voltage identification codes of the "VRD 10" technology and only a part of the voltage identification codes of the "VRD 11" technology are listed in FIG. 3B, the transform function disclosed in the present invention is suitable for all the voltage identification codes of the "VRD 10" technology as well as all the voltage identification codes of the "VRD 11" technology. In addition, the "VRD 10 to VRD 11" voltage identification code transform table is build by means of a transform function obtained from ranges of the plurality of supported voltages in the "VRD 10" technology and the "VRD 11" technology. As for the "VRD 10" technology, the voltages corresponding to all of the voltage identification codes is in between 1.6V~0.8375V. As for the "VRD 11" technology, the voltages corresponding to all of the voltage identification codes is in between 1.6V~0.5V. Hence, the transform function between the "VRD 10" technology and the "VRD 11" technology is represented as below: VRD11_out[7:0]={1'b0, VRD10_in[4:0], VRD10_in[5], 1'b01}-8'b0010_1000. Herein VRD11_out[7:0] represents the voltage identification code of the "VRD 11" technology and is a value of 8-bits; VRD10_in[4:0] represents the preceding five bits among the voltage identification code of the "VRD 10" technology; VRD10_in[5] represents a $6^{th}$ bit among the voltage identification code of the "VRD 10" technology; and 8'b0010_1000 equals a decimal digit of 40 and is represented by the binary system.

As FIG. 3B depicts, when VRD10_in[4] equals 0, VRD10_in[3] equals 1, VRD10_in[2] equals 0, VRD10_in[1] equals 1, VRD10_in[0] equals 0, and VRD10_in[5] equals 1, the corresponding first voltage V1 is equal to 1.6V. After processes of the "VRD 10 to VRD 11" voltage identification code transform table, the voltage identification code VRD11_out[7:0] of 8-bits will be outputted. Herein, VRD11_out[7] equals 0, VRD11_out[6] equals 0, VRD11_out[5] equals 0, VRD11_out[4] equals 0, VRD11_out[3] equals 0, VRD11_out[2] equals 0, VRD11_out[1] equals 1, and VRD11_out[0] equals 0, (that is, the voltage identification code VRD11_out[7:0] is equal to "00000010"), and the corresponding voltage V2 is equal to 1.6V as well.

What's more, some special commands need to be defined in the "VRD 10 to VRD 11" voltage identification code transform table. For example, in order to define an "OFF command", a situation that the preceding five bits (i.e., VRD10_in [4:0]) among the voltage identification code of the "VRD 10" technology are all equal to 1 is defined as the "OFF command". On the other hand, one of the voltage identification codes of the "VRD 11" technology is selected to represent the "OFF command". In this embodiment, a situation that the voltage identification code VRD11_out equaling "00000000" is selected as the "OFF command". Therefore, the "OFF command" can be directly defined in the "VRD 10 to VRD 11" voltage identification code transform table. That is, when the preceding five bits (i.e., VRD10_in[4:0]) among the voltage identification code of the "VRD 10" technology are all equal to 1, directly transform it into the "OFF command" to be outputted.

Figures 4A, 4B:
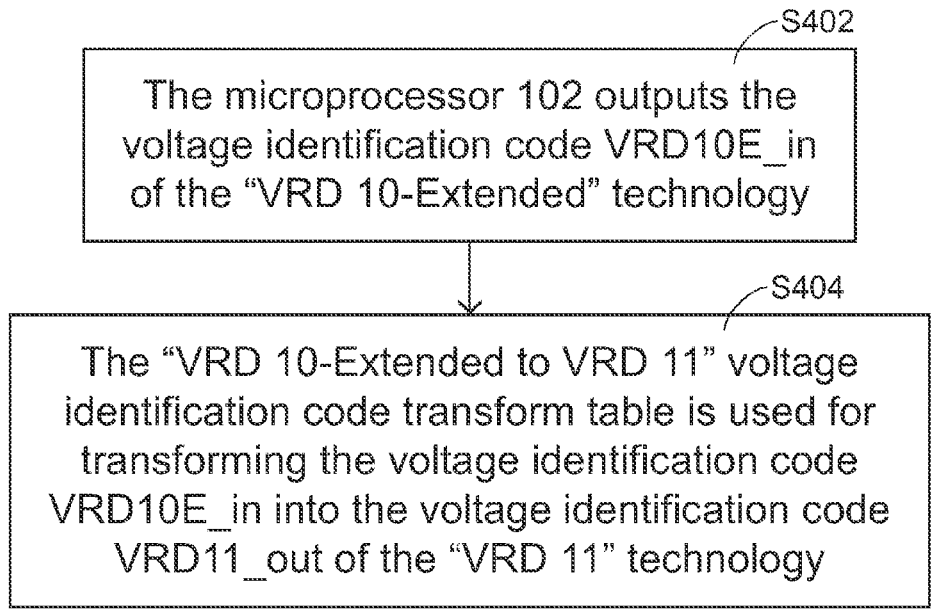
FIG. 4A is a flowchart illustrating a method for transforming voltage identification codes of a microprocessor according to a third embodiment of the present invention.
FIG. 4B is a diagram showing a voltage identification code transform table implemented by means of a very-high-speed integrated-circuit Hardware Description Language (VHDL) according to a third embodiment of the present invention.

FIG. 4A is a flowchart illustrating a method for transforming voltage identification codes of a microprocessor according to a third embodiment of the present invention. Please refer to FIG. 1 together with FIG. 4A for detailed descriptions of the present invention. In this embodiment, the transform table 108 of the voltage identification code transform circuit 106 is a "VRD 10-Extended to VRD 11" voltage identification code transform table, wherein the voltage identification code VID1 of the first voltage regulation standard is implemented by the voltage identification code VRD10E_in of the "VRD 10-Extended" technology and the voltage identification code VID2 of the second voltage regulation standard is implemented by the voltage identification code VRD11_out of the "VRD 11" technology.

As shown in FIG. 4A, the microprocessor 102 outputs the voltage identification code VRD10E_in of the "VRD 10-Extended" technology (i.e., Step S402), and the voltage identification code VRD10E_in is in correspondence with the first voltage V1. After that, the "VRD 10-Extended to VRD 11" voltage identification code transform table of the voltage identification code transform circuit 106 is used for transforming the voltage identification code VRD10E_in of the "VRD 10-Extended" technology into the voltage identification code VRD11_Lout of the "VRD 11" technology (i.e., Step S404), wherein the voltage identification code VRD11_out is in correspondence with a second voltage V2 the same as the first voltage V1.

FIG. 4B is a diagram showing the "VRD10-Extended to VRD11" voltage identification code transform table implemented by means of a Verilog coding (i.e., a very-high-speed integrated-circuit Hardware Description Language (VHDL)) according to a third embodiment of the present invention. Although only a part of the voltage identification codes of the "VRD 10-Extended" technology and only a part of the voltage identification codes of the "VRD 11" technology are listed in FIG. 4B, the transform function disclosed in the present invention is suitable for all the voltage identification codes of the "VRD 10-Extended" technology as well as all the voltage identification codes of the "VRD 11" technology. In addition, the "VRD 10-Extended to VRD 11" voltage identification code transform table is build by means of a transform function obtained from ranges of the plurality of supported voltages in the "VRD 10-Extended" technology and the "VRD 11" technology. As for the "VRD 10-Extended" technology, the voltages corresponding to all of the voltage identification codes is in between 1.6V~0.83125V. As for the "VRD 11" technology, the voltages corresponding to all of the voltage identification codes is in between 1.6V~0.5V. Hence, the transform function between the "VRD 10-Extended" technology and the "VRD 11" technology is represented as below: VRD11_out[7:0]={1'b0, VRD10E_in[4:0], VRD10E_in[5], ~VRD10E_in[6]}-8'b0010_1000. Herein VRD11_out[7:0] represents the voltage identification code of the "VRD 11" technology and is a value of 8-bits; VRD10E_in[4:0] represents the preceding five bits among the voltage identification code of the "VRD 10-Extended" technology; VRD10E_in[5] represents a $6^{th}$ bit among the voltage identification code of the "VRD 10-Extended" technology; ~VRD10E_in[6] represents a reverse of a $7^{th}$ bit among the voltage identification code of the "VRD 10-Extended" technology; and 8'b0010_1000 equals a decimal digit of 40 and is represented by the binary system.

As FIG. 4B depicts, when VRD10E_in[4] equals 0, VRD10E_in[3] equals 1, VRD10E_in[2] equals 0, VRD10E_in[1] equals 1, VRD10E_in[0] equals 0, VRD10E_in[5] equals 1, and VRD10E_in[6] equals 1, the corresponding first voltage V1 is equal to 1.6V. After processes of the "VRD 10-Extended to VRD 11" voltage identification code transform table, the voltage identification code VRD11_out[7:0] of 8-bits will be outputted. Herein, VRD11_out[7] equals 0, VRD11_out[6] equals 0, VRD11_out[5] equals 0, VRD11_out[4] equals 0, VRD11_out[3] equals 0, VRD11_out[2] equals 0, VRD11_out[1] equals 1, and VRD11_out[0] equals 0, (that is, the voltage identification code VRD11_out[7:0] is equal to "00000010"), and the corresponding voltage V2 is equal to 1.6V as well.

What's more, some special commands need to be defined in the "VRD 10-Extended to VRD 11" voltage identification code transform table. For example, in order to define an "OFF command", a situation that the preceding five bits (i.e., VRD10E_in[4:0]) among the voltage identification code of the "VRD 10-Extended" technology are all equal to 1 is defined as the "OFF command". On the other hand, one of the voltage identification codes of the "VRD 11" technology is selected to represent the "OFF command". In this embodiment, a situation that the voltage identification code VRD11_out equaling "00000000" is selected as the "OFF command". Therefore, the "OFF command" can be directly defined in the "VRD 10-Extended to VRD 11" voltage identification code transform table. That is, when the preceding five bits (i.e., VRD10E_in[4:0]) among the voltage identification code of the "VRD 10-Extended" technology are all equal to 1, directly transform it into the "OFF command" to be outputted.

In summary, the method for transforming voltage identification codes of a microprocessor disclosed in the present invention is capable of transforming voltage identification codes between miscellaneous voltage regulation standards, such that the microprocessor products can be operated in motherboards supporting with different voltage regulation standards so as to achieve the goal of the present invention.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for transforming voltage identification codes of a microprocessor, comprising the following steps:
    receiving a first voltage identification code of a first voltage regulation standard, wherein the first voltage identification code is in correspondence with a first voltage; and
    transforming the first voltage identification code into a second voltage identification code of a second voltage regulation standard, wherein the second voltage identification code is in correspondence with a second voltage the same as the first voltage, wherein a relationship between the second voltage identification code and the first voltage identification code is represented as:

$IMVP6\_out[L:0]=DT\_in[M:0]-C[N:0];$ wherein IMVP6_out[L:0] represents the second voltage identification code and is a value of L bits, L is a positive integer; DT_in[M:0] represents the first voltage identification code and is a value of M bits, M is a positive integer; and C[N:0] equals a decimal digit of a constant and is represented by the binary system by N bits, N is a positive integer.

2. The method for transforming voltage identification codes of a microprocessor of claim 1, wherein
    a transform table is built according to the relationship between the second voltage identification code and the first voltage identification code, the transform table comprising a third voltage identification code of the first voltage regulation standard as well as a fourth voltage identification code of the second voltage regulation standard, wherein the fourth voltage identification code is in correspondence with the third voltage identification code, and a fourth voltage corresponding to the fourth voltage identification code is the same as a third voltage corresponding to the third voltage identification code; and transforming the first voltage identification code into the second voltage identification code according to the transform table.

3. The method for transforming voltage identification codes of a microprocessor of claim 2, wherein the step for transforming the first voltage identification code into the second voltage identification code of the second voltage regulation standard further comprises the following steps:
    assigning a fifth voltage identification code of the first voltage regulation standard as a special command;
    assigning a sixth voltage identification code of the second voltage regulation standard as the special command; and
    defining the fifth voltage identification code and the sixth voltage identification code in the transform table.

4. The method for transforming voltage identification codes of a microprocessor of claim 1, wherein in the relationship between the second voltage identification code and the first voltage identification code, L=M=N=6 and C[N:0]= 7'b000_1001,
    7'b000_1001 equals a decimal digit of 9 and is represented by the binary system.

5. A method for transforming voltage identification codes of a microprocessor, comprising the following steps:
    receiving a first voltage identification code of a first voltage regulation standard, wherein the first voltage identification code is in correspondence with a first voltage; and
    transforming the first voltage identification code into a second voltage identification code of a second voltage regulation standard, wherein the second voltage identification code is in correspondence with a second voltage the same as the first voltage, wherein the first voltage regulation standard is a Voltage Regulator-Down Version 10, and the second voltage regulation standard is a Voltage Regulator-Down Version 11, wherein a relationship between the second voltage identification code and the first voltage identification code is represented as:

VRD11_out[7:0]={1'b0, VRD10_in[4:0], VRD10_in [5], 1'b0}−8'b0010_1000;

wherein VRD11_out[7:0] represents the second voltage identification code and is a value of 8-bits; VRD10_in [4:0] represents the preceding five bits among the first voltage identification code; VRD10_in[5] represents a $6^{th}$ bit among the first voltage identification code; 1'b0 before VRD10_in[4:0] represents 0 in one bit; 1'b0 after VRD10_in[5] represents 0 in one bit; and 8'b0010_ 1000 equals a decimal digit of 40 and is represented by the binary system.

6. A method for transforming voltage identification codes of a microprocessor, comprising the following steps:
    receiving a first voltage identification code of a first voltage regulation standard, wherein the first voltage identification code is in correspondence with a first voltage; and transforming the first voltage identification code into a second voltage identification code of a second voltage regulation standard, wherein the second voltage identification code is in correspondence with a second voltage the same as the first voltage, wherein the first voltage regulation standard is a Voltage Regulator-Down Extended Version 10, and the second voltage regulation standard is a Voltage Regulator-Down Version 11, wherein a relationship between the second voltage identification code and the first voltage identification code is represented as:

VRD11_out[7:0]={1′b0, VRD10E_in[4:0], VRD10E_in[5], ~VRD10E_in[6]}−8′b0010_1000;

wherein VRD11_out[7:0] represents the second voltage identification code and is a value of 8-bits; VRD10E_in[4:0] represents the preceding five bits among the first voltage identification code; VRD10E_in[5] represents a $6^{th}$ bit among the first voltage identification code; VRD10E_in[6] represents a reverse of a $7^{th}$ bit among the first voltage identification code; 1′b0 before VRD10_in[4:0] represents 0 in one bit; and 8′b0010_1000 equals a decimal digit of 40 and is represented by the binary system.

* * * * *